March 30, 1954 Q. BERG 2,673,345
APPLICATOR FOR CONNECTORS AND THE LIKE
Filed Dec. 2, 1950 10 Sheets-Sheet 1

INVENTOR
Quentin Berg
BY
Curtis, Morris + Safford
ATTORNEYS

March 30, 1954 Q. BERG 2,673,345
APPLICATOR FOR CONNECTORS AND THE LIKE
Filed Dec. 2, 1950 10 Sheets-Sheet 2
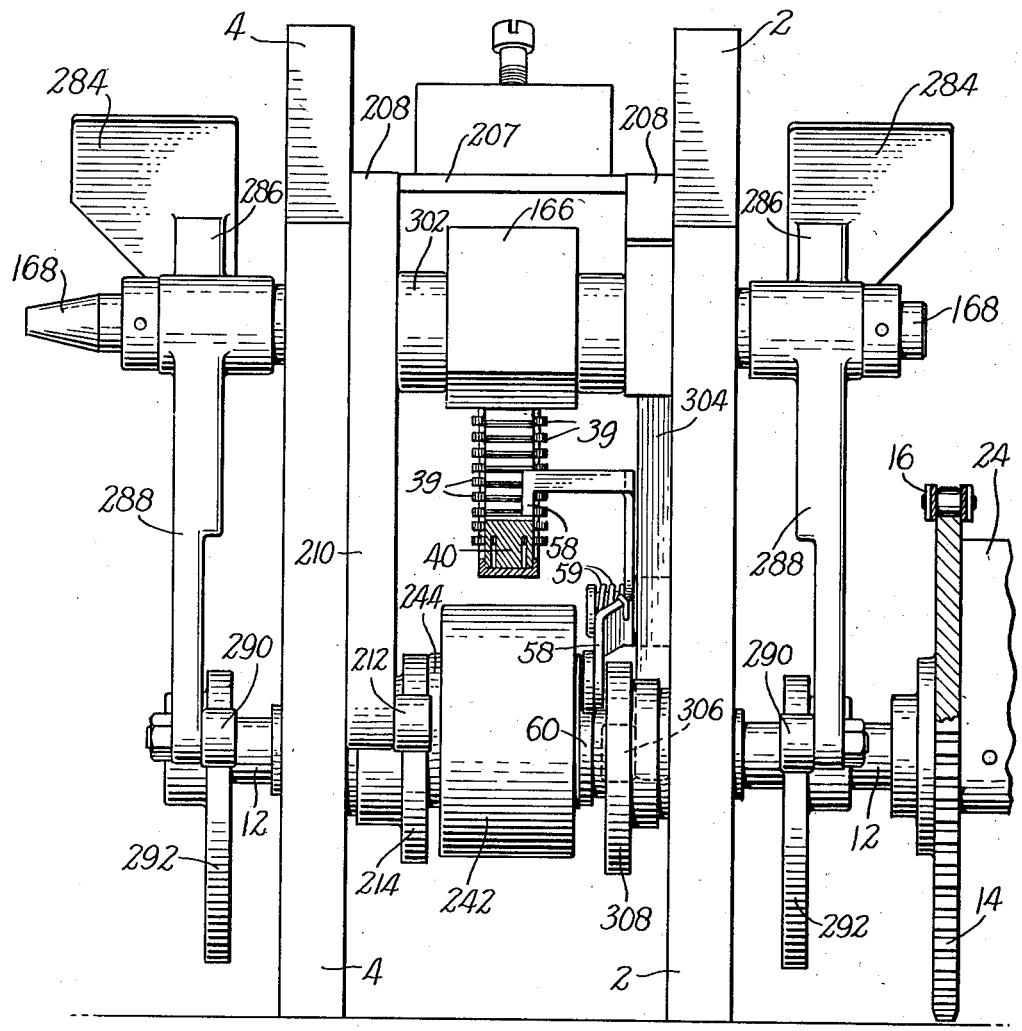
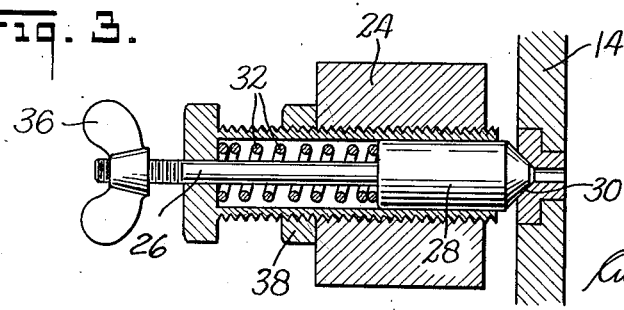
INVENTOR
Quentin Berg
BY
Curtis, Morris & Safford
ATTORNEYS March 30, 1954   Q. BERG   2,673,345
APPLICATOR FOR CONNECTORS AND THE LIKE
Filed Dec. 2, 1950   10 Sheets-Sheet 3

INVENTOR
Quentin Berg
BY
Curtis, Morris & Safford
ATTORNEYS.

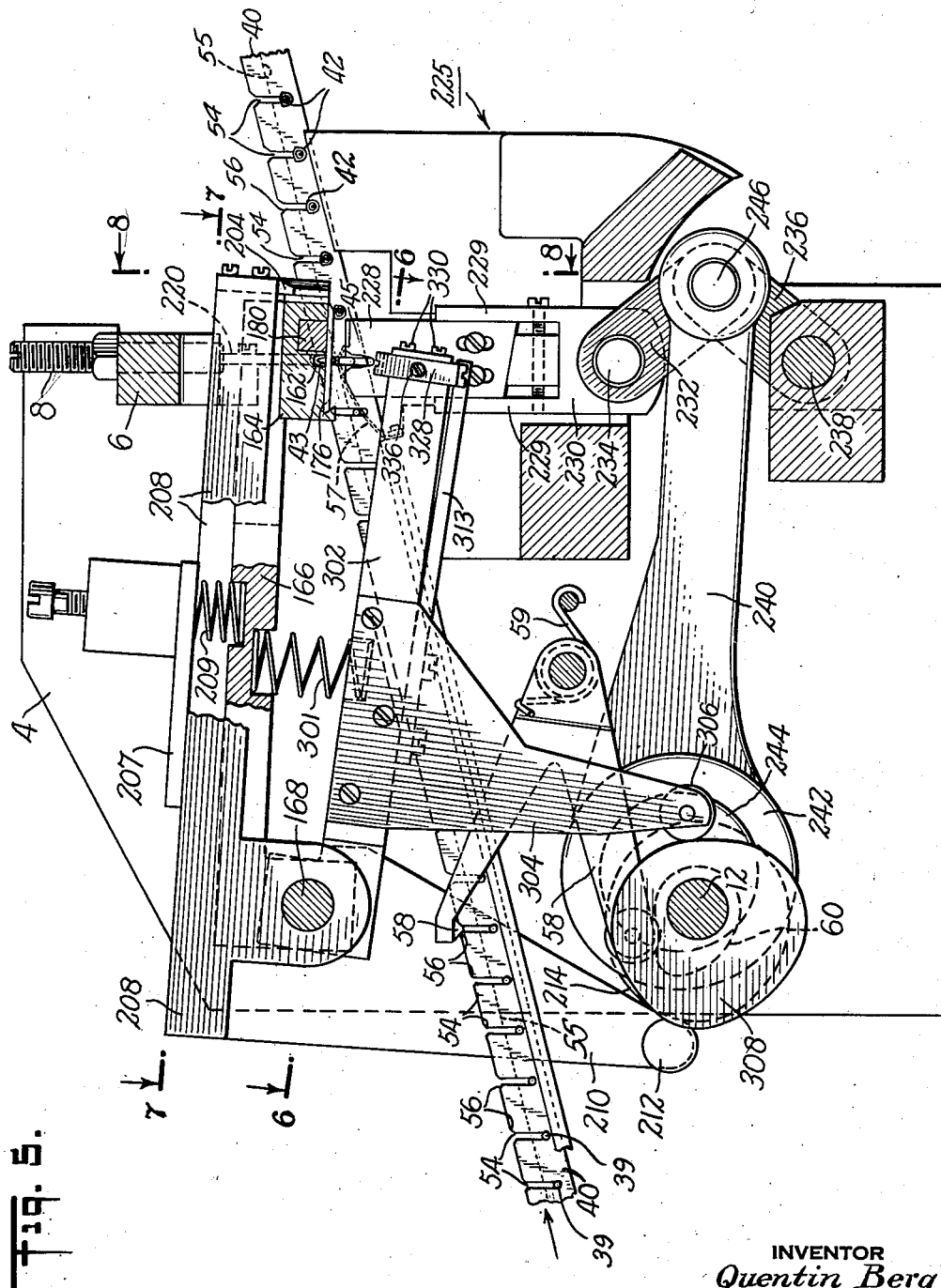

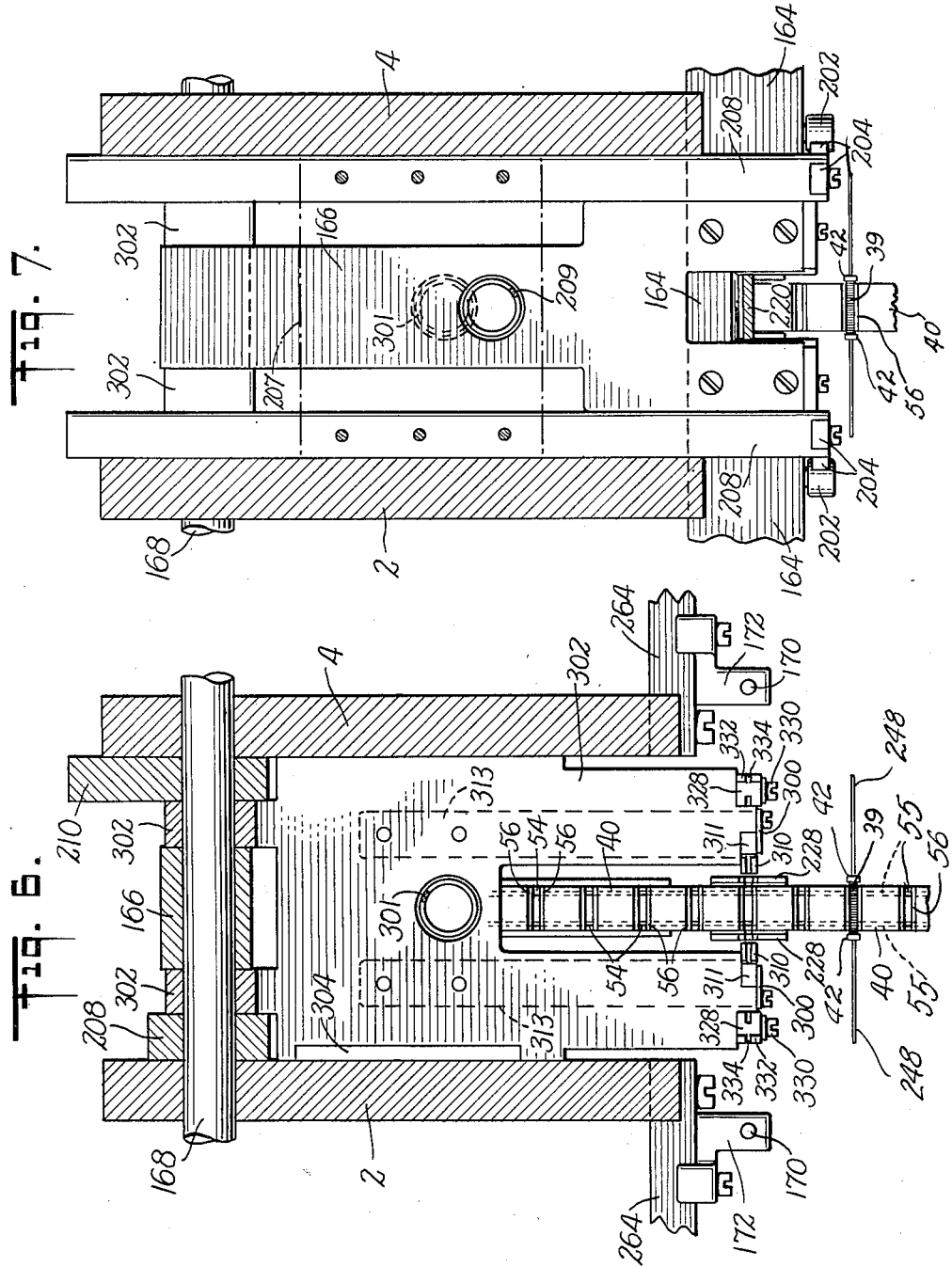

March 30, 1954
Q. BERG
2,673,345
APPLICATOR FOR CONNECTORS AND THE LIKE
Filed Dec. 2, 1950
10 Sheets-Sheet 6
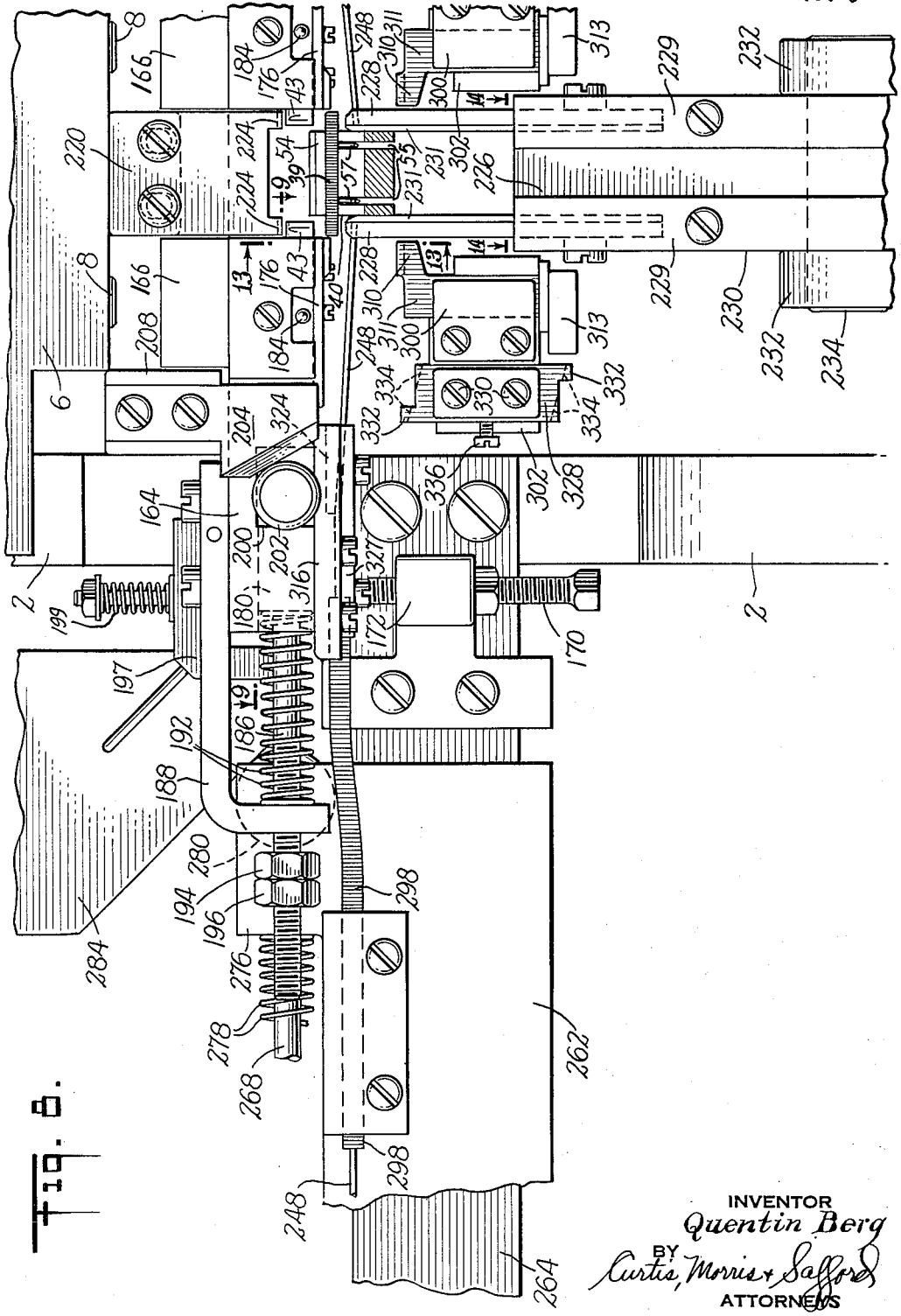

INVENTOR
Quentin Berg

March 30, 1954   Q. BERG   2,673,345
APPLICATOR FOR CONNECTORS AND THE LIKE
Filed Dec. 2, 1950   10 Sheets-Sheet 8
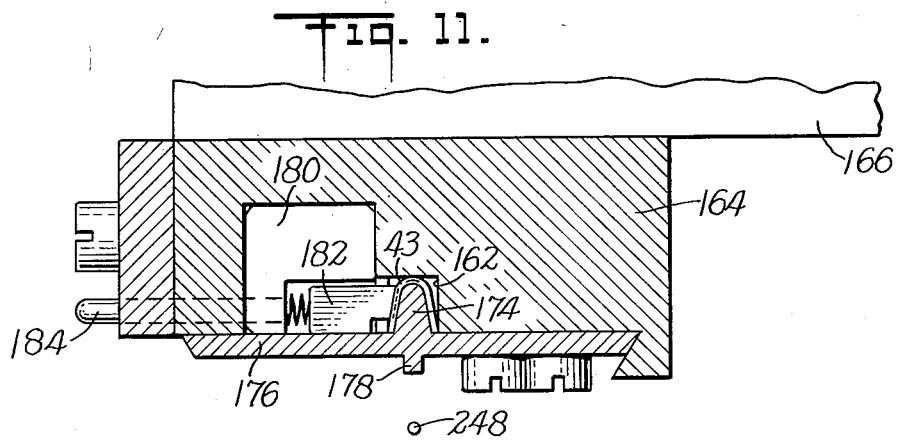
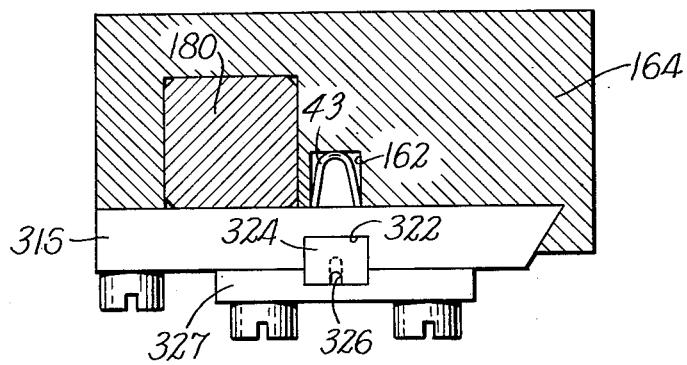
INVENTOR
*Quentin Berg*
BY
*Curtis, Morris & Safford*
ATTORNEYS March 30, 1954  Q. BERG  2,673,345
APPLICATOR FOR CONNECTORS AND THE LIKE
Filed Dec. 2, 1950  10 Sheets-Sheet 9
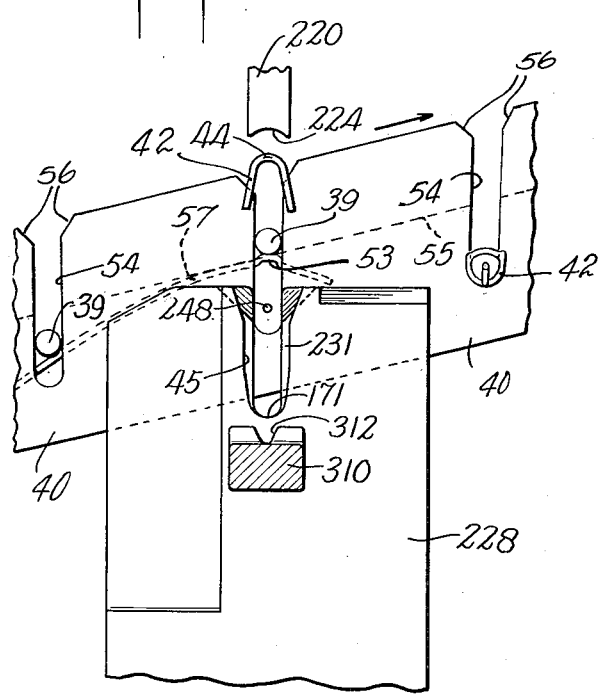
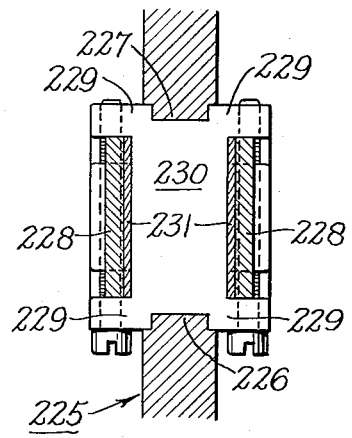
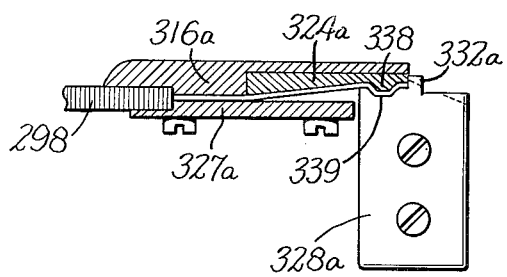
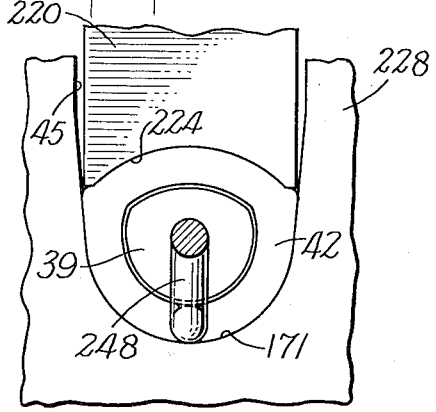
INVENTOR
Quentin Berg
BY
Curtis, Morris + Safford
ATTORNEYS

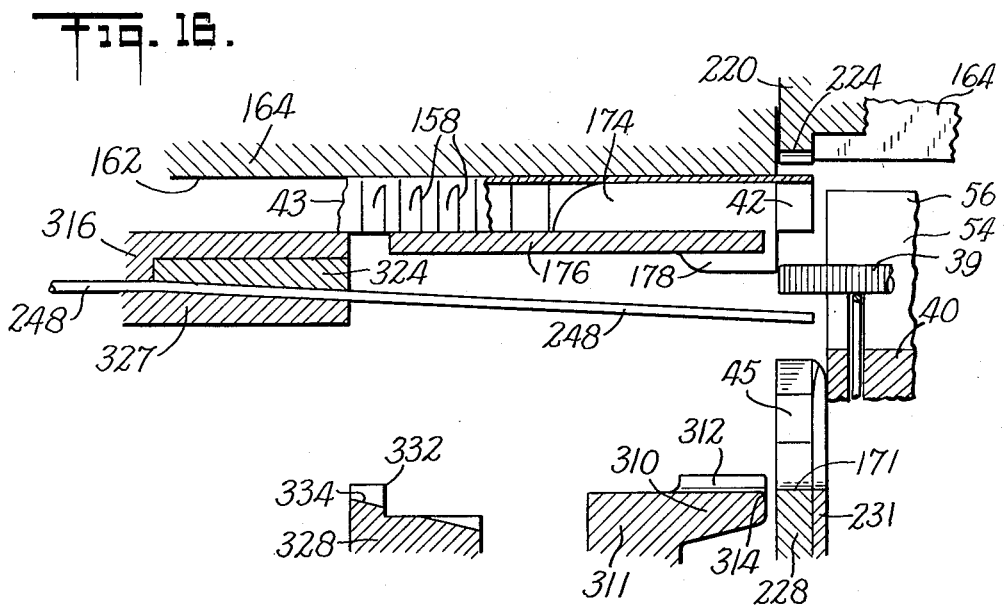
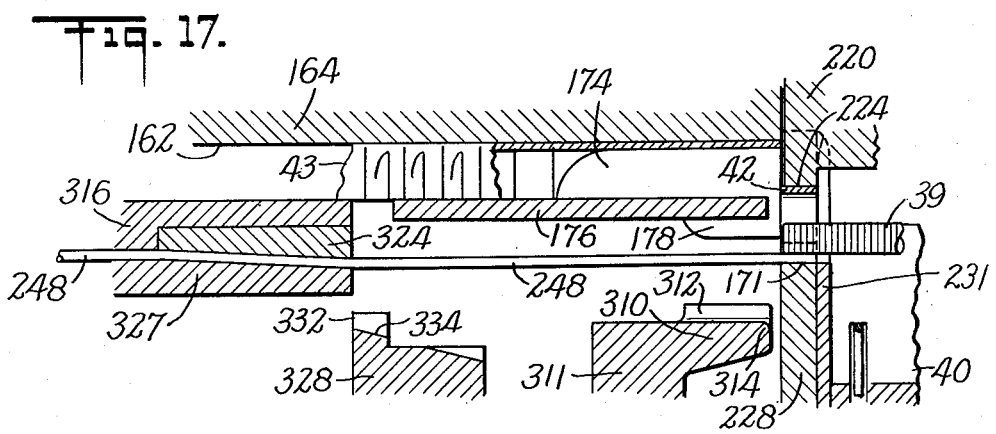
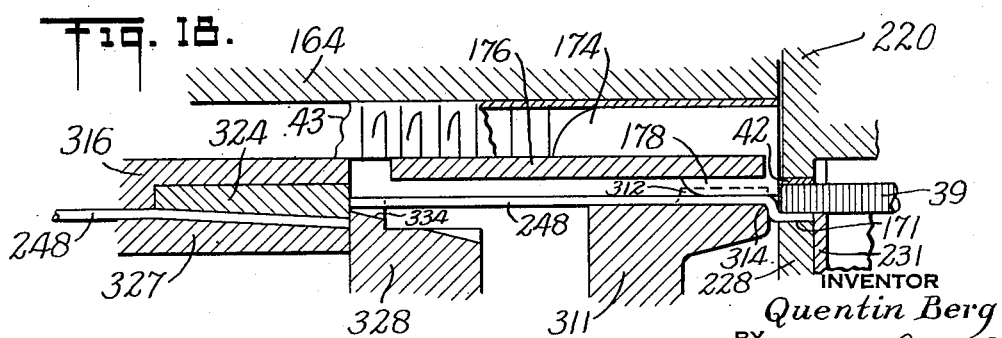

Patented Mar. 30, 1954

2,673,345

UNITED STATES PATENT OFFICE 2,673,345

APPLICATOR FOR CONNECTORS AND THE LIKE

Quentin Berg, New Cumberland, Pa., assignor to Aircraft-Marine Products Inc., Harrisburg, Pa.

Application December 2, 1950, Serial No. 198,765

12 Claims. (Cl. 1—165)

This application is a continuation in part of my application Serial No. 208,681 filed October 20, 1950, now abandoned.

This invention relates to apparatus for applying electrical connectors to opposite ends of an electrical element; and particularly to apparatus adapted for connecting lead-in wires to resistors, choke coils or the like, especially to those of comparatively small dimensions, such as are used extensively in radio and television apparatus. Such resistors or choke coils usually consist of a core of insulating material having spirally wound thereon a conductive wire; for example, fine resistance wire. Terminals are crimped upon the ends of the wire wound core; these terminals each comprising a lead-in wire and a ferrule for connecting the lead-in wire to the resistance or other wire which is wrapped about the core and for terminating its active length. For convenience the term "electrical element" is used herein to designate all articles generally to which such terminals may be assembled automatically by the machine of the present invention, regardless of whether or not the article is intended to perform as a resistor, inductance or mere conductor, etc.

A general object of the present invention is to provide a machine by the operation of which such electrical elements may be provided with terminals or other connections automatically and rapidly, strongly and with such accuracy that the completed electrical elements exhibit a high degree of uniformity and are produced at much less manufacturing cost than heretofore. More particularly the invention relates to a machine designed to sever connector portions from longer strips in which they are connected partially preformed and largely pre-sheared, assemble these connector portions and forge them onto the electrical elements in their proper functional relations to each other and to the electrical element. The machine of the present invention is also designed to produce resistors or choke coils and the like which are of novel and improved construction more particularly described and claimed in my copending application for patent, Serial No. 191,156, filed October 20, 1950.

Important features of the invention include the novel means for feeding and locating the parts to be assembled, the novel means for insuring uniform positioning of terminals or other connections on the product by preventing uncontrolled shortening of the distance between such connections during the process of application, and the novel timing and arrangement of the various mechanisms by which the electrical element may have connectors and lead-in wires attached simultaneously to both ends thereof and in a predetermined measured relation to each other.

Other objects, important features and advantages of the invention, to which reference has not hereinabove specifically been made, will appear hereinafter when the following description and claims are considered in connection with the accompanying drawings.

In this specification and the accompanying drawings, I have shown and described a preferred embodiment of my invention; it is to be understood that this is not intended to be exhaustive or limiting of the invention, but on the contrary is for purposes of illustration in order that those skilled in the art may fully understand the invention and principles thereof and the manner of applying it in practical use so that they may modify and adapt it in various forms, each as may be best suited to the conditions of a particular use.

In the accompanying drawings:

Figure 2 is a rear elevation of the central area of the machine shown in Figure 1, simplified by omission of elements to the front, and sides of the machine;

Figure 1:
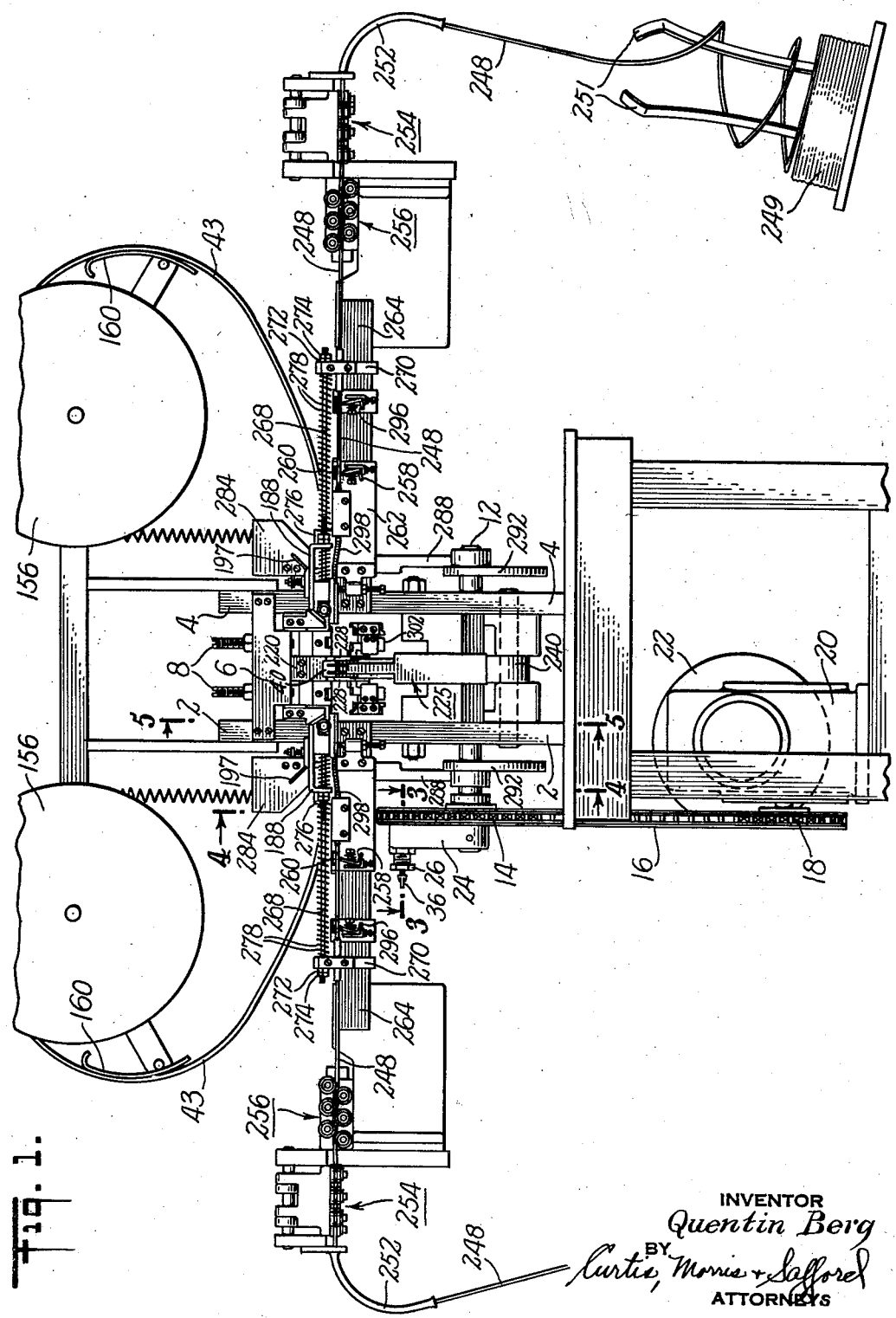
Figure 1 is a front elevation of an automatic connection applicator which embodies this invention in preferred form.
Figure 4:
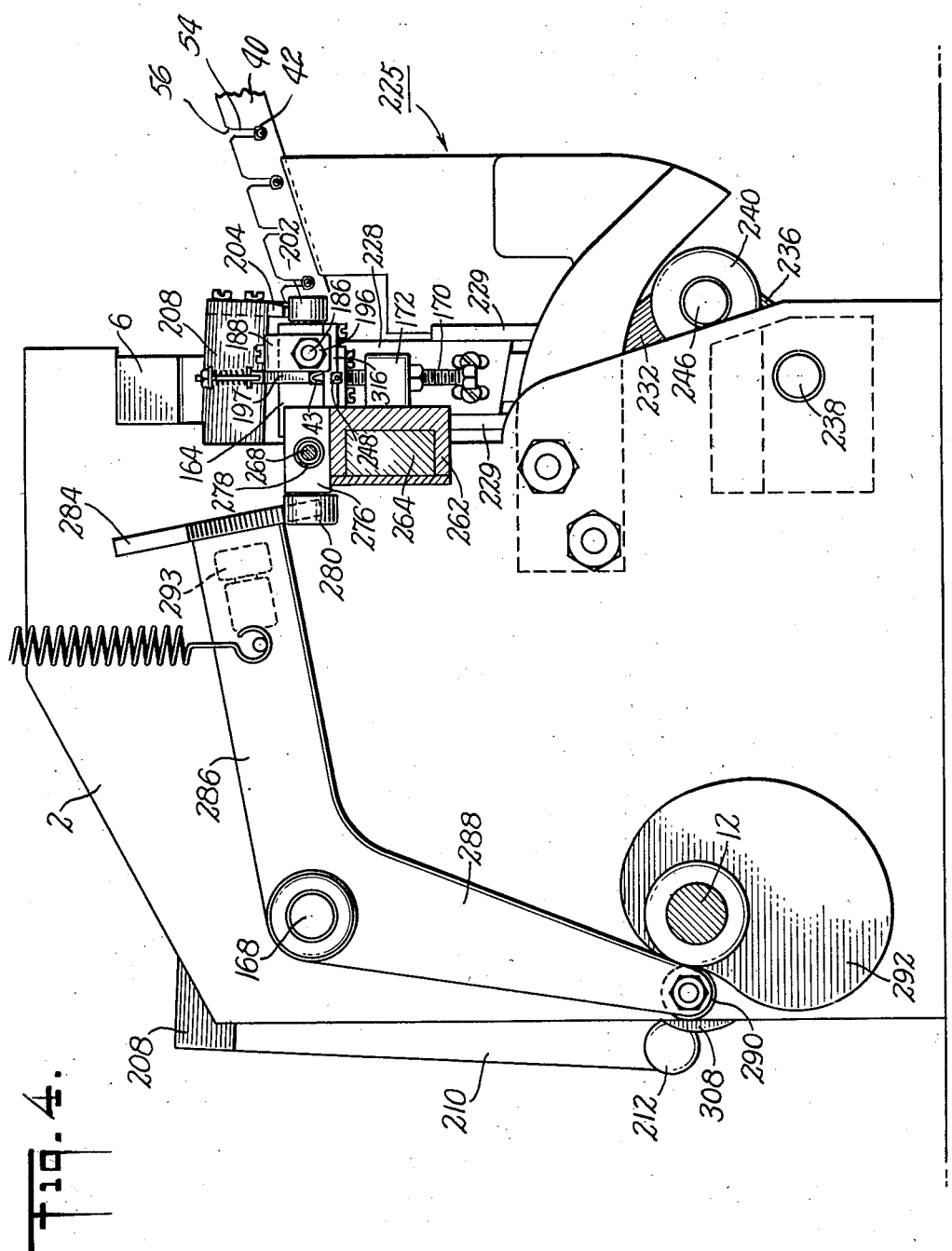
Figure 9:
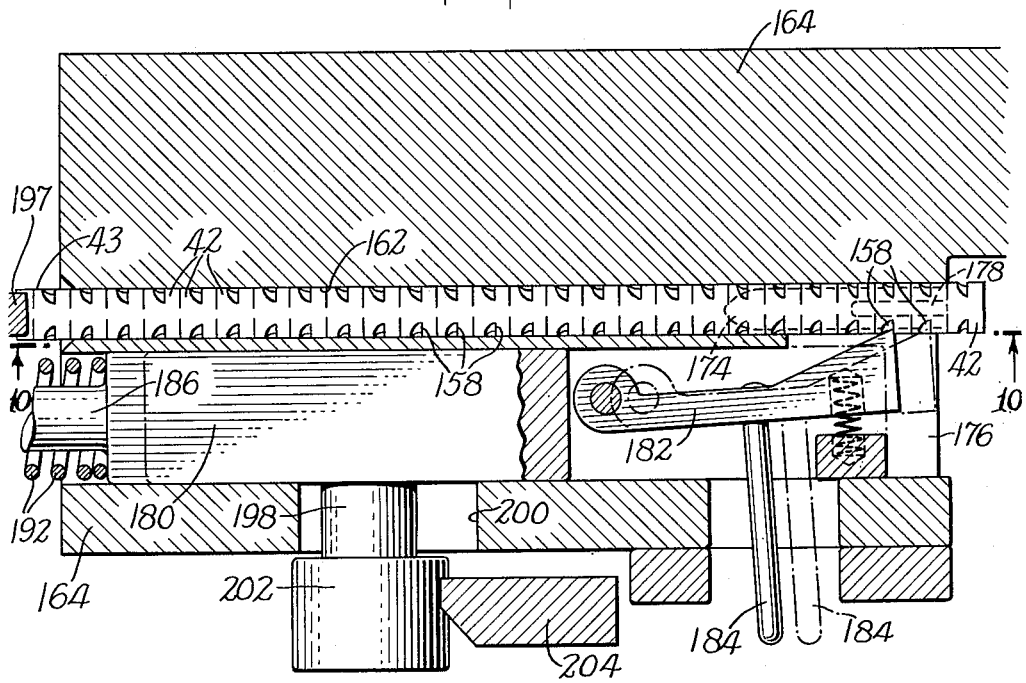
Figure 10:
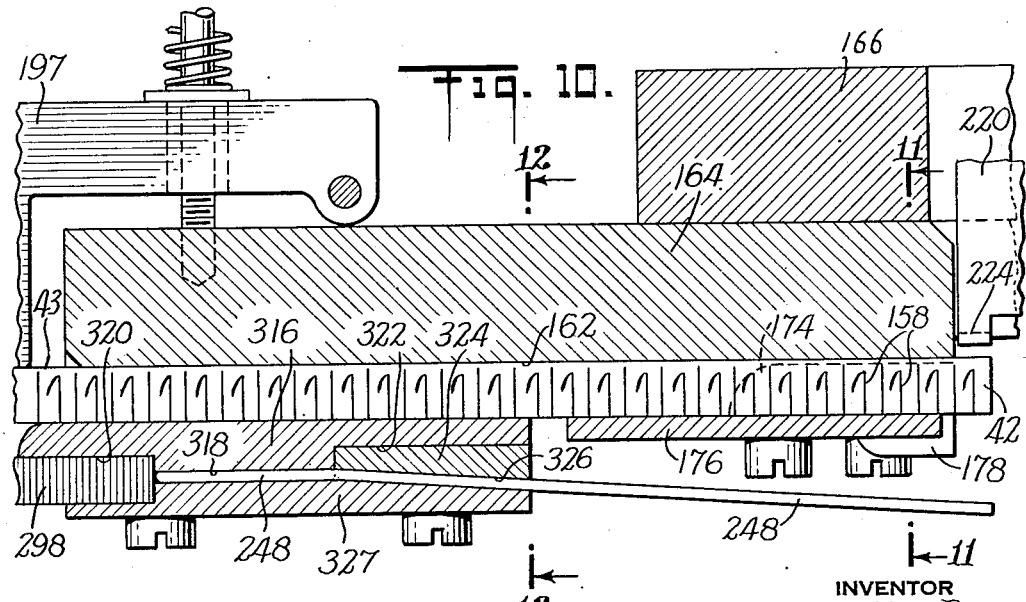

Figure 3 presents in axial cross-section an overload clutch embodied in a preferred form of the invention and taken on line 3—3 of Figure 1;

Figure 4 is a cross-sectional view taken at the line 4—4 in Figure 1;

Figure 5 is a cross-sectional view taken at the line 5—5 in Figure 1;

Figure 6 is a horizontal sectional view taken at the line 6—6 in Figure 5;

Figure 7 is a horizontal sectional view taken at the line 7—7 in Figure 5;

Figure 8 is an enlarged front elevational view of the left central portion of the machine as shown in Figure 1, taken at the line 8—8 in Figure 5;

Figure 9 is a horizontal sectional view taken at the line 9—9 in Figure 8, of an advantageous connector-strip feed mechanism;

Figure 10 is a longitudinal vertical sectional view taken at the line 10—10 in Figure 9;

Figure 11 is a cross-sectional view taken at the line 11—11 in Figure 10;

Figure 12 is similar to Figure 11, though taken at the line 12—12 in Figure 10;

Figure 13 is an enlarged side view of the connector-crimping dies, taken at the line 13—13 in Figure 8;

Figure 13-A is a greatly enlarged view of the crimping die surfaces, connector ferrule, core and wire, as shown in Figure 13, after they have been brought into compressive relationship, this relationship also shown in Figure 18;

Figure 14 is an enlarged horizontal section of the lower crimping die assembly, taken at the line 14—14 in Figure 8;

Figure 15 is a sectional view similar to the lower left portion of Figure 10 of an advantageously modified wire cutting and deforming mechanism;

Figures 16 through 18 are longitudinal, vertical sectional views of the connector strip feed block, crimping dies, and wire-deforming and cutting members, showing successive stages in the relative movements of these members.

As is seen in Figures 1 and 2, in the illustrative embodiment of the invention the frame of the assembling machine proper comprises left and right side plates 2 and 4 extending from the base of the machine to the top thereof and connected near the top by a crossplate 6 having adjustable applicator stop screws 8 projecting therethrough and serving to limit the upward movement of the applicators, hereinafter more fully described. The side plates 2 and 4 of the frame carry rotatably therein a cam shaft 12 which extends beyond the left side plate 2 and has thereon a sprocket wheel 14 driven through a sprocket chain 16 passing over a sprocket wheel 18 on the output shaft of a reduction gear 20, the input shaft of which is driven by an electric motor 22.

The sprocket wheel 14 is itself mounted to turn freely on the cam shaft 12 but has a driving connection thereto through a crank arm 24 fixed to the shaft 12 and provided with a spring-pressed detent 26 in the arm 24. The end of the detent 26 is in the form of a conical plunger 28 to engage a hardened conical seat 30 set into the sprocket wheel 14. A wing nut 36 on the stem of detent 26 limits its outward movement. The pressure of the plunger 28 on the seat 30 is adjustable, as shown, by virtue of the detent assembly being threaded into the arm 24, a lock nut 38 being provided for securing the assembly in its adjusted position. See Figure 3.

The purpose of thus connecting the sprocket wheel 14 to the shaft 12 is to provide a safety overload clutch to relieve forces which would otherwise be built up in the crimping area of the machine in the event of a connector ferrule becoming jammed in the crimping mechanism. When this happens the plunger 28, which is pressed into the seat 30 with sufficient force to transmit normal driving torque, will pop out, allowing the sprocket 14 to continue its rotation without the driven arm 24. The clicking noise as the conical plunger 28 passes over the seat 30 in the sprocket 14 will indicate to the operator that the machine is clogged.

Mounted upon the cam shaft 12 are the cams, hereinafter more fully described, which actuate the mechanisms for feeding the connector strip and wire into position to be operated on by the cutting and crimping mechanisms and which also effect the actuation of the cutting and crimping elements. As hereinabove suggested, the resistor 39, which is shown in the drawings as an electrical element of the type to the use of which the present invention is directed, comprises a core of insulating material helically wound with a conductive wire. Although this material may be supplied in coils and cut in the machine to the length required for each resistor, I have here shown these as being supplied in proper length and manually inserted into slots 54 of a carrier 40 (see Figure 5) with a connector ferrule-receiving length of the core projecting therebeyond at each side. Referring to Figures 2 and 8, upon each of these projecting ends is crimped a connector ferrule 42. The ferrule-forming elements are brought into a straddle relation to the core ends (see Figure 13) by feeding continuous strips 43 thereof from each side of the carrier one ferrule length at a time. Referring to Figures 16, 17, and 18, the ferrule-forming elements are cut from these strips 43 in the same operation which crimps them on the core ends. A lead-in wire 248 is also fed into position on each side of the carrier 40 under the ferrule-forming elements 42 and over the female die cavities 45 in the crimping mechanism. As these dies move upward in the crimping operation, the wire 248 and the free ends of the ferrule-forming element 42 are gathered into the die and formed thereby, the wire being clamped between the two edges of the ferrule thus formed as the ferrule is crimped upon the end of the core (see Figure 13-A. At the end of this crimping operation, and continuing the same stroke, the lead-in wire is cut off by the shear edges 324 and 334 (Figure 8) and simultaneously formed with an offset by the foot 310 acting against anvil 178 so as to bring the lead-in wire into axial alignment with the resistor core. In the machine as illustrated, these operations are performed simultaneously on both sides of the carrier at both ends of the core.

Although the means to feed and discharge the core elements is advantageously automatic, e. g., reciprocating core retainers, or an endless series of core retainers such as a chain or wheel with the retainers spaced thereon, moved step by step by appropriate linkages from the cam shaft; I have here shown a manually operated feed slide 40 for simplicity and clarity.

In the illustrative embodiment of the invention, as is shown in Figures 2, 5, 6 and 8, the carrier 40 is a rectangular channel block slidably mounted in an aperture between the crimping dies 228 and anvils 224 on the upper face 47 of a central frame structure 225 described below. The upper edge of the carrier 40 is provided with notches or recesses 54 uniformly spaced along its upper face, these recesses being of such width as to receive the resistor core and coil with a free sliding fit and to retain it in position for the subsequent operations thereon.

It will be noted in Figure 5 that one side of each of the recesses 54 is bevelled off at 56 at substantially a 45° angle to bear against the correspondingly bevelled edge of a detent pawl 58, this pawl being driven into the recesses 54 by a stiff spring 59, and being lifted therefrom by action of a cam 60 on shaft 12. This pawl 58 acts to maintain the carrier 40 with one recess, which is carrying a core, in accurate registering relation to the crimping mechanism during the crimping operation. At least one other such recess, which is to receive a new core, is maintained in a position at the rear of the crimping mechanism by this pawl 58 and, when this pawl is disengaged, by a spring-loaded detent 53 engaging a bottom recess 55. The feeding or indexing of the slide 40 from core-receiving position to the crimping position, as well as the return of the empty carrier, is effected manually in the illustrated embodiment. A feeler-guide, such as a pair of spring wires 57 enter downwardly opening longitudinal grooves 55 in the slide 40 and engage the slots 54 by virtue of upwardly offset detent portions 53 to identify the crimping positions. The final alignment, when the slide has been pushed into position, is by engagement of the pawl 58 in the recess 54.

As hereinabove stated, the first step in assembling the resistor is the feeding of a suitable length of the wire wound resistor core into position in one of the recesses or slots 54 in the carrier 40. This feeding of the resistor core into one of the slots 54 in the carrier 40 is effected at a point behind the crimping position, and then the slide is moved toward the front, bringing such core elements into the assembly and crimping position.

The carrier 40, with a resistor core of proper length projecting a sufficient amount at each end from the recess 54 therein, is accurately positioned by the operation of the detent pawl 58. In this position, as will now be more fully described, a ferrule element will be fed into position above the core and adjacent the dies 224 and 228, and at each end of the core. The ferrule pieces as fed have their open side downward so that the core can be pushed up into them from the bottom. The connectors in the form of strips 43 of connected and partially preformed ferrules, are supplied to the machine from reels 156 (see Figure 1) and fed to a position just below the anvil 224 of the applicator along a path approximately parallel to the axis of the core. Reels 156 are located above the machine on each side thereof as shown in Figure 1.

As best shown in Figures 11, 12 and 13, each of the preformed ferrules is of substantially U shape before it is brought into straddle relation to the core end and crimped thereon, and the ferrules are advantageously connected by a very small amount only of material at the apices of the inverted U's. This area after severance is seen at 44 in Figure 13. Except for this area, the partially preformed ferrules in the strip have been severed from each other. On the sides the ferrule elements are provided with indentations 158 (Figures 9 and 10) which may be engaged by the feeding and retaining pawls, hereinafter to be described, of the ferrule strip feeding mechanism. These ferrule elements and the strip and the method of making them are the subject of a copending application for patent Serial No. 191,156, filed October 20, 1950.

From the coils upon the reels 156 the strips 43 on each side of the machine are fed through and utilized in right and left assembly mechanisms, otherwise identical. The connector strips preferably pass first over spring plates 160. The purpose of these plates is to eliminate jerk on the reels and consequent erratic feeding (as more particularly set forth and claimed in the copending application, Serial No. 65,646, filed December 16, 1948). The strip then enters one end of a guideway 162 (see Figures 9 and 10) in a strip holder block 164 constituting a part of an operative unit of the machine hereinafter referred to generally as the applicator. Referring to Figures 5 and 7, this block 164 is mounted on a swinging arm, which may be identified as a wobble bar 166, fulcrumed on a shaft 168 upon which other levers, hereinafter to be described, are also fulcrumed, the shaft 168 extending through the side plates 2 and 4 of the machine frame. The applicator, mounted on its wobble bar 166, normally rests in its lower position determined by the adjustable stop screws 170 mounted on projections 172 on the fronts of the side plates 2 and 4 of the machine (Figures 4 and 6).

As is shown in Figures 10, 11, and 16, at its end nearest the carrier 40, each guideway 162 has therein an upwardly projecting anvil rib 174 fitting within the strip of ferrule elements and having, at its end nearest the carrier 40, an edge serving as a support for cooperation with the anvil or male member of the crimping mechanism to shear off the ferrule element projecting over the edge thereof. This guide rib 174 is mounted by a plate 176 attached to the under face of the strip feed block 164. The rib projects slightly beyond the end of the plate 176 and also slightly beyond the end of the guideway 162. A portion 178 of the rib 174 extends below the plate 176 and serves as an anvil against which the wire former can operate as explained below.

The means for feeding the connector strips into the crimping positions comprise pawl-carrying slides 180 arranged to slide in guideways in the applicator. Referring to Figures 9 through 12, these slides carry feed pawls 182 having handle projections 184 by which the pawls can be held out if the strip is to be withdrawn. These pawls engage the indents 158 on one side of the ferrule-forming pieces of the connector strip. Slide 180 has a reduced threaded end 186 which extends (Figure 8) through a stop member 188 of L shape, the long arm of the member being secured to the top of the applicator block 164. A spring 192, surrounding the reduced end 186 of the slide 180 and confined between the slide 180 and the stop member 188, tends to move the slide 180 in the strip feeding direction. A nut 194 screwed on the reduced end 186 of the slide 180 abuts the stop 188 and provides means for adjusting the amplitude of movement of the slide 180 and the pawl 182 toward the carrier 40. A lock nut 196 is preferably provided for maintaining the adjustment. A retaining pawl 197 (Figure 10) pivotally mounted on the stop member 188 and pressed against the strip 43 by a spring 199 holds the strip 43 against backward movement, and this also has a long handle (Fig. 8) for holding it out of engagement, when the strip is to be pulled out.

A stud 198 (Figure 9) on one side of the slide 180 projects through a slot 200 in the strip feed block 164 and carries on its outer end a cam roll 202 cooperating with a bevel cam plate 204 attached to the front end of an arm 208 of a bellcrank lever fulcrumed upon the shaft 168. The other arm 210 of the bellcrank carries a cam roll 212 cooperating with a cam 214 on the cam shaft 12 (Figures 2, 5, 7, and 8).

From the foregoing description it will be seen that, when the cam 214 rocks the bellcrank lever to depress the arms 208 and with it the cam plates 204, the inclined faces of these cam plates will move the slides 180 against the action of the springs 192 and thus move the pawls 182 back along the connector ferrule strip into position to engage the indentation 158 on the next ferrule portion. It will further be seen from Figures 5 and 9 that, when the cam 214 allows the bellcrank to rock back under the action of the springs 209, 301 (as hereinafter described), the spring 192 will cause the pawl 182 to feed the connector ferrule strip forward one ferrule length; and that the precise length of feeding is controlled by the adjustment of the nuts 194 and 196. Both bellcrank arms 208 are connected together by a cross plate 207 which engages a spring 209; and thus they require only a single arm 210. Thus the arms 208 and cams 204, on both sides of the machine, are actuated simultaneously to feed connector strip toward each side of the carrier 40 and into position to be applied to the projecting ends of the resistor core.

Referring to Figures 5 and 8, projecting downward from the cross plate 6 at the front of the machine and into the opening between the right and the left feed blocks 164 is an anvil plate 220 secured to the cross plate 6, this plate having formed thereon two crimping anvils or male crimping members 224.

Referring to Figure 14, secured to the side plates 2 and 4 is an inner frame 225 carrying vertical rails 226, 227 beneath the anvils 224. Cooperating with the anvils 224 are female crimping dies 228 carried upon a slide 230 movable vertically on the rails 226, 227 and provided with retaining strips 229 engaging the sides of the rails. Each female crimping die 228 cooperates with an anvil 224 on its side of the carrier 40 (see Figures 5 and 8).

The form of the crimping die cavity 45 is shown in Figure 13. The bottom 171 of the cavity is cylindrical of radius appropriately larger than the core 38 so that the ends of the connector can push around the bore 39 between it and the walls of this cavity 45. Above this the sides are tangential to this cylindrical bottom and diverging at an angle of 10° to one another for a distance about equal to the radius, and above that are parallel for a slightly greater distance, and then extend outwardly to form a V-shaped mouth, the sides of which are at about 20° angles to the parallel portions.

As is seen in Figures 13 and 14, located between the female crimping dies 228 and the carrier at each side are stop plates 231, which are plates having slots therein adapted to fit loosely against opposite sides of the resistor core whereby they project over the inner ends of the crimping openings of the female crimping dies and serve primarily to limit the feeding of the strip which is adjusted to otherwise overfeed by nuts 194 and 196, and to the extrusion of the ferrule metal when crimped, and to prevent such extrusion of the metal from locking the resistors to the carrier 40. These plates thus also accurately limit the distance between the edges of the crimped ferrules and thus prevent reduction of the effective length of the resistor by such extrusion.

It will be noted from an inspection of Figure 13 that the operative ends of the anvils 224, that is, the ends which engage the curved tops of the ferrules during the crimping operation are concave so as at least partially to form these curved tops to fit tightly on the core. The sides of the anvils adjacent to the ends of the guide ribs 174 (Figure 18) are slightly spaced therefrom so that they do not provide a shear with the adjacent edges of the ribs 174, but support the ferrule portions of the strip so that it can shear itself, as more fully set forth in my copending application Serial No. 191,156 filed October 20, 1950.

When the connector ferrules have been fed into position over the projecting ends of the resistor core and the female crimping members 228 are moved upwardly, at the same time the cam 214 allows spring 209 to move the arm 210 to lift the arms 208 and cams 204, and cam 308 starts to operate bellcrank 302—304 in the same direction. Wobble bar 166 with its applicator is biased downward from 208 by spring 209 and bellcrank 302—304 is biased downward by spring 301 so as to keep 306 against cam 308. In the open position shown in Figures 1 and 4, the applicator is pressed against the lower stop 170 by action of the spring 209, and bellcrank 208—210 had driven cam 204 down on roller 202 to move the strip-feed slide 180 outward against spring 192; but as the bellcrank 208—210 is moved up the roller 202 is released, the strip fed, and the applicator is lifted from the lower stop 170 and pressed against the upper stop 8 by the crimping dies 228 and shears off the end connector from the strip 43 as it moves (Figures 16, 17 and 18). As the ferrule portion 42 is sheared free from the strip, the female die 228 engages the legs of the ferrule portion and starts the crimping operation.

At this time the arms 208 move relatively toward the applicator a little bit so as to move cams 204 down on rollers 202 and thus relieve the pressure of the next connector of the strip 43 and prevent it from binding against the anvil.

Referring again to Figures 5 and 14, the slide 230 which carries the female crimping dies 228, and in the form of the invention so far described, also carries the stop plates 231, slides vertically on rails 226 and 227; and the vertical sliding movement is effected by means of a toggle comprising an upper link 232 pivotally connected to the slide 230 at 234 and a lower link 236 pivotally connected to the frame at 238, a driving yoke bar 240, having a collar 242 surrounding an eccentric 244 on the cam shaft 12, being connected to the knee joint of the toggle at 246. Turning of the shaft 12 and with it the eccentric 244 will obviously cause the straightening and breaking of the toggle and thus positively effect the upward and downward strokes of the slide 230.

Before the upward movement of the slide 230 begins, however, that is, before the starting of the ferrule-severing and crimping operations, the lead-in wire is fed into position into or over the female crimping die between its lower surface 171 and the projecting end of the resistor core, so that as the crimping operation proceeds, the bottom of the die picks up the end of this wire which will then be gripped between the side edges of the ferrule as they pass along the die surface under the core. Thus the wire becomes a permanent part of the assembled structure.

As is seen in Figure 1, the wire 248 from which the lead-in wires are formed is taken from coils of wire 249 and fed into each end of the machine, these coils being preferably supported on floor stands having outwardly flaring spring fingers 251 serving to prevent the succeeding turns of the coil from slipping off the holder and tending to tangle the wire. The wire from the coils is first led in through a curved guide tube 252 into a straightening device of standard type made up of upper and lower straightening rolls 254 turning about vertical pivots, between which the wire passes, and then through a second set of straightening rolls 256 similarly arranged and turning about horizontal pivots. This straightening device is located outside the machine frame side members 2 and 4 and may be supported in any suitable manner so that it remains in fixed relation to the main frame.

The rolls in the inner set (horizontal axes) are advantageously arranged as shown in Figure 1, i. e., with the innermost roll on the top of the wire so that a very slight curl is left in the wire to bias it against the bottom 171 of the crimping die cavity 45.

From the straightening device the wire 248 travels through a wire feeding device of the "silent ratchet" type, the one herein shown being sold under the trade name of "Dickerman Hitch Feed." This wire feed comprises a gripper plate 258 set at an inclination to the holder in which it is located so that the wire is gripped between the upper edge of the plate and the top 260 of the holder, this gripping increasing as the wire resists feeding. The feed gripper 258 is shown as mounted on a slide 262 sliding on a support 264 extending outside the main frame of the machine but bolted to the front edge of the side frame member. One of these wire feeder assemblies is connected to each side frame member. Connected to the slide 262 is a rod 268 which is slidable through a stop 270 connected to the support 264. This rod has outside the stop 270 an adjustable stop nut 272 and a lock nut 274. Surrounding the threaded rod 268 and confined between an upstanding part 276 on the slide and the stop 270 is a spring 278 tensioned to produce the forward feeding movement of the gripper 258, this movement limited by the stop nut 272.

Referring to Figures 1 and 4, a cam roll 280 mounted on a stud shaft on the upright part 276 of the slide 262 is arranged to be engaged by a cam 284 on the bellcrank arm 286 fulcrumed on an extension of the shaft 168 outside the side plate of the machine frame, the other arm 288 of the bellcrank carrying a cam roll 290, which engages a cam 292 on an extension of the cam shaft 12 outside the side plate of the main frame of the machine. Cam 284 is provided with a wheel 293 which rolls on the side plate 2 or 4 to relieve arm 286 of the reaction to pushing slide 262. Rocking of the bellcrank by the cam 292 will cause the cam 284 to move downwardly and, by wedging between the side plate 2 or 4 and the cam roll 280, to move the slide 262 outwardly against the spring 278, the movement of the slide being such that when the bellcrank rocks back to its original position, the slide 262 and with it the gripper 258 will move forward to feed a predetermined length of wire, that is, a length sufficient to provide the desired length of lead-in wire. To prevent backward movement of the wire, a second gripper 296 is mounted on the support 264 and the wire passes through this second gripper and is therefore prevented from moving backward.

Referring now to Figure 8, the wire as it is fed forward by the hitch feed mechanism just described next passes through a flexible wire guide 298 preferably connected at its inner end to a guide block in the applicator which is so located that it directs the end of the wire into the upper end of slot 45 of crimper 228, as is shown in Figure 13. The wire feeding mechanism is advantageously so adjusted that the end of the wire being fed stops substantially short of the stop plate 231 (adjacent the die surface 171) so that the cut end of the wire will be far enough back from the inner edge of the crimped ferrule to assure effective gripping of the resistor coil beyond it if the cut end of the lead-in wire should damage the resistor wire during the crimping.

It should be observed in the foregoing that all of the several feed mechanisms are spring operated in the feeding direction and power operated by a cam or other pusher means in the retracting direction only. This permits simple adjustment of the feed amplitude and precise location of the material so fed by the use of nuts such as 194, 272, etc.; and it also protects the apparatus against damage in case of jamming of the feed due to kinks in the wire or strip or defects as to size, etc.

The lead-in wire remains unsevered until the crimping operation has been completed. During the crimping the edges of the ferrule scrape the bottom of the die surface where the lead-in wire lies and pinch it between them as is shown in Figure 13-A. The final movement of the dies effects a circumferential compression beyond its elastic limit of the ferrule 42; and during this compression both the edges of the ferrule and the wire between them are distorted so as to assure that the wire will not rotate in nor pull out from the crimped terminal.

Since the wire as it is crimped between the edges of the ferrule is eccentric to the axis of the resistor core, it is desirable for convenience in the later steps affecting the resistors, e. g., molding of insulating jackets thereon, to offset the wire sufficiently to bring it into axial alignment with the resistor core. Referring to Figure 5 the means for effecting the offsetting of the lead-in wire and for severing it from the main wire supply are carried on the front end of the arm 302 of a bellcrank lever fulcrumed on the shaft 168. The other arm 304 of this bellcrank is provided with a cam roll 306 which engages a cam 308 on the cam shaft 12. These parts are arranged to operate after the crimping operation has been completed. Since there are two wires being fed simultaneously there must be two wire formers and cutters and as shown in Figure 6, the front end of the arm 302 is severed into two spaced arms which merge at the rear into a broader plate, which is connected at one side to a single arm 304. This broader plate portion is formed with a well in its bottom in which is seated the spring 301 by which the arms 302 and 304 are maintained downward with roller 306 in pressure contact with the cam 308.

The wire former, as shown particularly in Figures 8 and 16, comprises a forming foot 310 on a short bar 311 slidably mounted in a vertical channel in the forward end of the arm 302 and held therein by the plate 300. The bar 311 rests at the bottom of the channel on strong steel fingers 313 which are secured to arm 302 only near the back (see Figures 5 and 6) thus giving appreciable resilient yield, allowing the bar 311 to slide down in its channel when it has pushed the wire against the anvil 178.

The foot 310 is provided with a V-shaped notch 312 in a raised portion thereof for centering the wire during the forming operation (Figure 13), and the notch has a rounded edge 314 over which the wire is bent and slid as the offset is formed. This bending operation occurs while the ferrules are compressed in the crimping dies, i. e., while the die 228 is at substantially the top of its travel as is shown in Figure 18, so that the bending force applied to the wire cannot loosen it in the connector ferrule 42.

Referring to Figures 8 and 16, the lead-in wire is cut off by shearing between a shear blade 328 carried by the arm 302 and a cooperating cutting edge 326 on the wire guide plate 316 on the bottom of the strip feed block 164 in the applicator. In the lower surface of this plate is formed a groove 318 of a dimension to fit the wire loosely. As is better seen in Figure 10, at one end a larger groove 320 is formed to receive and clamp the end of the flexible wire guide 298. At its cut off end the plate 316 is provided with a larger rectangular groove to receive a hardened insert 324 having therein a groove 326 in continuation of the groove 318. The end of this insert serves as the shear edge to cooperate with the shear blade 328 mounted on the arm 302. A removable plate 327 covers the grooves 318 and 326 and clamps the insert 324 at one end and the flexible wire guide 298 at the other end.

The shear blade 328, as shown in Figure 8, is reversible from end to end to save resharpening. The blade comprises a block 328 having holes therein through which it may be bolted as shown at 330 to the arm 302; and having, at each end, an extension or raised portion 332 (note Fig. 16) having therein a notch 334, the bottom of which provides the shearing edge. This shear blade is fastened into a notch in the end of the arm 302 in such position that when the arm 302 is swung into its upper position the side edge of the blade will align with the shearing edge of the hardened insert 324 and thus shear off the lead-in wire from the wire in the applicator guide. The holes for bolts 330 are larger than the clamping bolts used therein, thus allowing for adjustment; and a set screw 336 is provided to facilitate precise adjustment of the position of the shearing edge. The parts are preferably so adjusted that the forming of the lead-in wire will have commenced taking place before the shearing or cutting operation. To assure this the machine may be returned manually until the forming foot 310 begins to press against the wire. With both bolts on the shear blade loosened and the set screw 336 backed off, the blade 328 is moved up until it abuts the wire in slot 334, and its lower end pushed against the abutment on arm 302 between it and the presser foot bar 311. The lower bolt is then tightened to a friction hold in the blade and the set screw 336 adjusted to press the top corner lightly against the end of the shear insert 324. Both bolts are then securely tightened to hold the adjustment.

In a modified aspect of the invention shown in Figure 15, the tip of the wire being fed is offset as a part of the shearing operation so that when it is fed into position to form the next lead-in wire, it will have an offset end portion to be more readily engaged between the side edges of the ferrule. This result is accomplished by use of the projection 338 on the insert 324a and a corresponding recess 339 on the cut-off blade 328a. It is possible also to form the offset to make the lead wire coaxial by this same operation by use of dies whose shape corresponds to the offset; but it is more accurate to form that offset after crimping and while the product is held gripped in the crimping die.

In the operation of the machine, it first rests in the position shown in Figure 1, with the toggle knee retracted and the crimping die 228 just beyond its lowermost position, the pawl 58 having just dropped into slots 54 to hold slide 40 and with a fresh resistor core in position, the bellcrank 208—210 is in its lowermost position wherein the strip feed roller 202 is pushed back against spring 192, the wobble bar 166 is pressed down against the stops 170, bell crank 302—304 is in its lowermost position, bellcrank 286—288 is down, thus camming slide 262 outward against spring 278.

As the machine operates from its position of rest, the detent pawl 58 depressed into slot 54, accurately positioning it in line with the crimper recesses 45, connecting rod 240 is operated by its eccentric on shaft 12 to straighten the toggle and move up the crimping die 228; at about the same time bellcranks 208—210 and 302—304 are moved up by their cams on shaft 12. As bellcrank 208—210 moves up, it frees the roller 202 and allows the connector strip to feed a connector-ferrule element into position under the anvil 220 by the action of spring 192. As the crimping die 228 moves up, it lifts the applicator wobble bar 166 until it brings the end connector of strip 43 against the anvil 224 and as it pushes beyond that position the end ferrule-element, sliding on the abutting ferrule element in the strip, shears the small connection left at the base of the U. When the connector ferrule is thus severed, the wobble plate 166 is subsequently moved on up against its upper stop 8 by the dies 228. At the same time bellcrank 286—288 has moved up retracting its cam 284 from roller 260 and allowing slide 262 to feed a length of wire into position under the end terminal and over the cavity of die 228, just below the projecting end of the resistor core 39.

Continued operation moves the crimping die 228 upward driving the free edges of the connector ferrule along its concave surface under the resistor core 39 until they squeeze the wire 248 between them, and thus, at the end of the crimping stroke, forging the ferrule and the wire so that it has full permanent grip on the resistor and the wire. As the crimping is thus completed, the lower bellcrank 302—304 is moved up farther, forming the offset in the wire over the foot 310 against anvil 178 and, during this forming, cutting it off at the shear 324—328. The effective operation is then complete and the parts return to their initial positions, after which slide 40 is moved to bring another slot 54 into position, the completed resistor is removed, and another core 39 put in its place.

As has been hereinbefore mentioned, this invention can be utilized in the application of various types of connectors, e. g. ring-tongue terminals, pin-type plugs, and the like; to predetermined lengths of various electrical elements, including other conductors such as insulated wire etc. Naturally, specific elements in the invention will be modified to meet the needs of a particular application. Where a lead wire is not required to be connected as shown, other types of crimping die structures well adapted to particular connections may be used. A wider carrier, or even a synchronized set of carriers, may be used to carry longer lengths of electrical element. The element retaining means in the carrier need not always be a slot—e. g., spring clips might be more feasible in some applications. In short, the broader aspects of the invention, as can be understood from the accompanying claims, are to be appreciated in adapting it to various applications.

I claim:

1. In a machine for applying connector leads to opposite ends of an electrical element, the combination of a three leaf hinge unit, upper and lower stops for the intermediate leaf, an intermittent drive for the upper leaf including a one way drive connection arranged to push it down and to release it for retraction, an intermittent drive for the lower leaf including a one way drive connection arranged to push it up and to release it for retraction, springs urging the lower leaf down and the upper leaf up with respect to the middle leaf, the middle leaf carrying at its end an applicator comprising a connector strip guideway, a spring-operated reciprocating ratchet feed positioned beside said guideway, a support at the end of said guideway for holding remaining connector portions of the strip while the last connector portion is severed, one of said other leaves carrying a cam which engages said ratchet feed to retract it against the force of its spring when said upper and intermediate leaves of the hinge unit are closed together, the other leaf of the hinge unit carrying wire-forming and shearing dies which cooperate with dies mounted on the adjacent side of the middle leaf, an anvil cooperating with said support at the end of said guideway to sever connectors fed through said applicator guideway, and a female crimping member cooperating with said anvil to crimp severed connectors onto an electrical element.

2. Apparatus for assembling resistors and the like comprising, in combination, a carrier having a transverse recess therein for receiving and retaining for subsequent operations thereon an electrical element of predetermined length and adapted intermittently to feed said elements successively into position for said operations, said carrier being so transversely dimensioned relative to the length of said elements that a ferrule-receiving length of said elements projects beyond each end of the carrier, step-by-step feed mechanism for bringing strips of uncrimped U-shaped ferrules into approximately straddle relation to the respective projecting ends of said elements, and supporting said strips behind the end ferrule thereof, step-by-step feed mechanism for bringing wire leads into position at the side of said elements opposite to the side on which the ferrules are fed, wire shearing means, concave cylindrical crimping dies faced toward said positions of the wire leads and of said ferrules and movable toward said ferrules to sever the end ferrules from the strips and crimp the ferrules upon projecting ends of the elements, anvils on the opposite side of said ferrules from said dies, and a press to actuate said ferrule severing means, to move said dies toward said anvils to drive the ferrule edges along the die faces into gripping relation to the wire leads and to actuate said wire shearing means.

3. Apparatus for assembling resistors or the like according to claim 2 which further comprises a multiple bend type wire straightener, associated with each wire feed, the final bending surface of which straightener is arranged with its convex bending surface facing away from the ferrule strip whereby to feed each wire lead into a position against the bottom of the crimping recess in the female crimping member during the crimping movement thereof.

4. Apparatus for assembling resistors or the like according to claim 2 which further comprises forming means for offsetting the wire leads to substantially axial alignment with the center axis of the die opening, each of said means consisting of an anvil substantially parallel to and adjacent said axis and a presser foot movable toward said anvil to press the wire thereagainst and having at its toe a forming groove through which the wire is drawn to form the offset and a shear for cutting off the lead from the wire feed, each wire feed and presser foot and the associated female crimping die being timed to feed wire into the die while it is below its crimping position a distance substantially greater than the diameter of the wire, and to bring the presser foot past the central axis of the die opening while the crimping die is at the end of its crimping movement.

5. In a machine for assembling electrical connectors onto both ends of a length of an electrically conductive element, means for feeding two continuous strips of electrical connectors toward one another in end-to-end aligned relationship, carrier means for feeding lengths of said element transversely to the directions of movement of said strips, said lengths being maintained in substantially parallel relationship to said strip, and locating means acting on said carrier means to assure the successive accurate alignment of lengths of said element with the ends of said strips, and means for severing the end connectors from each of said strips and crimping them onto the ends of said length of electrically conductive element.

6. A machine according to claim 5 in which said means for severing and crimping comprises means pushing the remainder of the strip away from said end connector in a direction parallel to the plane of its end edges, while said end connector is held by the crimping means, for simultaneously severing said end connectors as they are brought into straddle relation to the core ends.

7. A resistor assembling machine according to claim 5 having means for feeding, prior to crimping, predetermined lengths of lead-in wire into position between the bottom of said female die and the location of the core ends to be gripped by said end connector during crimping and having means for severing said predetermined lengths of lead-in wires after they are gripped by the connectors.

8. A resistor assembling machine according to claim 7 having forming means operating after crimping of the connectors onto the elements and lead-in wires for offsetting the projecting ends of said lead-in wires to bring them into axial alignment with the resistor core.

9. A machine as defined in claim 5 in which said strip feeding means, said carrier locating means, said severing means and said crimping means are actuated by a common drive means and so timed that said strip feeding means has come to rest and said locating means engages said carrier when said severing and crimping means operate on the connectors at the ends of said strip.

10. A combination as defined in claim 1 in which said intermittent drives for said upper and lower leaves and said crimping means are actuated by a common drive and so timed that said cam engaging said ratchet feed is released prior to actuation of the crimping means and said leaf carrying wire forming and shearing dies is driven toward said middle leaf while said crimping means are compressing connectors onto said electrical elements.

11. A machine as defined in claim 10 which further comprises step-by-step wire feed mechanisms actuated by said common drive and timed to feed lengths of wire past said forming and shearing dies and into positions to be engaged by said severed connectors when said severed connectors are crimped onto said elements.

12. In a machine for assembling electrical connectors onto both ends of a length of an electrically conductive element, means for feeding two continuous strips of electrical connectors toward one another in end-to-end aligned relationship, carrier means for feeding lengths of said element transversely to the directions of movement of said strips, said lengths being maintained in substantially parallel relationship to said strips, and locating means acting on said carrier means to assure the successive accurate alignment of lengths of said element with the ends of said strips, means to move lengths of said element so aligned and the connectors at the ends of said strips together in a direction transverse to the feeding movement of said lengths and to the feeding movement of said strips, and means for severing the end connectors from each of said strips and crimping them onto the ends of said length of electrically conductive element.

QUENTIN BERG.

References Cited in the file of this patent

UNITED STATES PATENTS

| Number | Name | Date |
|---|---|---|
| 2,169,802 | Keller | Aug. 15, 1939 |
| 2,290,673 | Cole | July 21, 1942 |
| 2,396,913 | Carlson | Mar. 19, 1946 |
| 2,430,365 | Polivka | Nov. 4, 1947 |
| 2,438,023 | Sirp | Mar. 16, 1948 |